US005995877A

United States Patent [19]

Brueggemann et al.

[11] Patent Number: 5,995,877

[45] Date of Patent: Nov. 30, 1999

[54] CONTROL UNIT FOR SWITCHING AND CONTROLLING HOUSEHOLD APPLIANCES

[75] Inventors: Ulrich Brueggemann, Heustreu; Gerhard Hochgesang, Bad Neustadt; Wolfgang Kuechler, Ostheim; Klaus Schmoeger, Bad Neustadt, all of Germany

[73] Assignee: Preh-Werke Gmbh & Co. KG, Bad Neustadt/Saale, Germany

[21] Appl. No.: 08/965,684

[22] Filed: Nov. 6, 1997

[30] Foreign Application Priority Data

Nov. 6, 1996 [DE] Germany ........................... 196 45 678

[51] Int. Cl.[6] ............................. G05B 9/02; G05B 19/42

[52] U.S. Cl. ................................................ 700/85; 700/83

[58] Field of Search .............................. 364/188; 341/22; 340/407.2; 392/418; 219/392

[56] References Cited

U.S. PATENT DOCUMENTS 4,190,785 2/1980 Kompanek .............................. 310/330
4,737,767 4/1988 Kompanek et al. .................... 340/365
5,053,585 10/1991 Yaniger ..................................... 178/18
5,673,041 9/1997 Chatigny et al. ......................... 341/22
5,736,942 4/1998 Randolph ................................. 341/22

FOREIGN PATENT DOCUMENTS

3920257A1 1/1991 Germany .
4229731A1 1/1993 Germany .
4407741A1 9/1995 Germany .

*Primary Examiner*—William Grant
*Assistant Examiner*—Kidest Bahta
*Attorney, Agent, or Firm*—Griffin, Butler, Whisenhunt & Szipl, LLP

[57] ABSTRACT

A control unit (1) for switching and controlling functions (6) of household appliances has a continuous control surface (2) with operational areas (3) and a printed film (5). Several piezosensors (4) are arranged on a back of a plate forming the control surface (2), connected firmly and rigidly to the plate. The piezosensors (4) can be located in a film packet (9), for example, through which the piezosensors (4) are electrically connected to a processor (12). Through an offset arrangement of the piezosensors (4) in a matrix pattern direct illumination or back lighting of the printed film (5) can be achieved, thereby improving an operator's visual recognition while permitting accurate recognition of a function by the processor (12). An input filter (15) prevents operator error due to unintentional actuation of the control unit.

17 Claims, 4 Drawing Sheets

CONTROL UNIT FOR SWITCHING AND CONTROLLING HOUSEHOLD APPLIANCES

BACKGROUND OF THE INVENTION

This invention relates to a control unit for switching on and off and controlling household appliances, specifically large household appliances such as kitchen ranges (stoves), dishwashers, washing machines, and similar devices. More particularly the invention relates to such a control unit having a control surface without perforations formed by a plate that is stable in form, and a pressure-sensitive signal generator to which a processor is attached for processing electrical signals generated. The invention also relates to a process for switching and controlling household appliances that involves a pressure-sensitive signal generator generating electrical signals that are sent to a processor for analyzing pressure exerted on a control surface for selecting a function.

German patent document (DE 39 20 257 A1) discloses a control unit (control panel) having control elements, with corresponding display elements. Since control buttons are used, an operational area of a control surface is perforated and difficult to clean.

German patent document (DE 42 29 731 A1) discloses a control panel which is included in a built-in housing with a cover plate. In this design, the display and/or control elements of the control panel are arranged on the inside of the cover plate. A household appliance can also be switched and controlled via remote infrared control. Also here buttons are used as control elements.

German patent document (DE 44 07 741 A1) discloses a sensor switching device. In addition to control buttons for switching an appliance on or off a microprocessor is included for switching on or off a power control device, such as a heating element on a cook top of a range, for example. For safety reasons, two control buttons must be pressed in a time sequence for switching the power control device on.

U.S. patent document (U.S. Pat. No. 4,190,785) discloses a pressure-sensitive signal generator. A piezoelectric layer is sandwiched between an electrically conductive substrate, or support material, and electrodes. The piezoelectric layer is present across an entire lower surface of the substrate. Action, or push, points in the form of pads are located on the substrate at specified positions, with an electrode located under the piezoelectric layer corresponding to each action point. When pressure is applied to a pad, an output voltage between the substrate and the respective electrode is modified. When this is done, an output voltage is defined for each pad such that a location where pressure is applied is determined in a signal processor by means of a nominal/actual comparison. An application of pressure beside the pads creates conditions that are indefinable for the signal processor, and operator errors may occur.

It is an object of this invention to provide a control unit for switching and controlling a household appliance in which an operational area of a control surface is not perforated, and, regarding its manipulation positions can be readily adapted to suit requirements of various appliances, and which reduces operator error.

SUMMARY

According to principles of this invention, operational areas are integrated into a control surface, to which individual pressure-sensitive sensors, which are rigidly coupled to a plate forming the control surface, are directly allocated.

When pressure is applied on the control surface for selecting a function, the pressure-sensitive sensors generate simultaneous signals U1, U2 of differing intensities that are forwarded to a processor for evaluating the signals and coordinating the function selected on the operational area.

According to further principles of this invention, pressure-sensitive sensors generate simultaneous signals U1, U2 of differing intensities when pressure is applied at one point in an operational area of the control surface. These signals are evaluated in the processor by comparison with each other, with a signal having the greatest intensity representing a pressure center of the application of pressure. The selected function, after the signal is determined, is allocated to a function stored in the processor, and the actuated function is switched on or off or controlled by a power control unit electrically connected to the processor.

Individual piezosensors are used for activating functions. Signals generated by the piezosensors are evaluated with aid of the processor and, depending on a selected function, are routed to a power control device for switching the selected function. The processor filters out signals generated by brief, unintentional pressure exerted on the piezosensors. This makes operator error less likely, because intentional pressure over a longer period of time is required for switching a household appliance on or off and controlling it. An actuating pressure exerted on the piezosensors is transmitted through a plate forming a sealed, rigid control surface, which is watertight and thus easy to clean.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout different views. The drawings are not necessarily to scale, emphasis instead being placed upon illustrating principles of the invention in a clear manner.

DESCRIPTION OF THE PREFERRED EMBODIMENT

Figure 1:
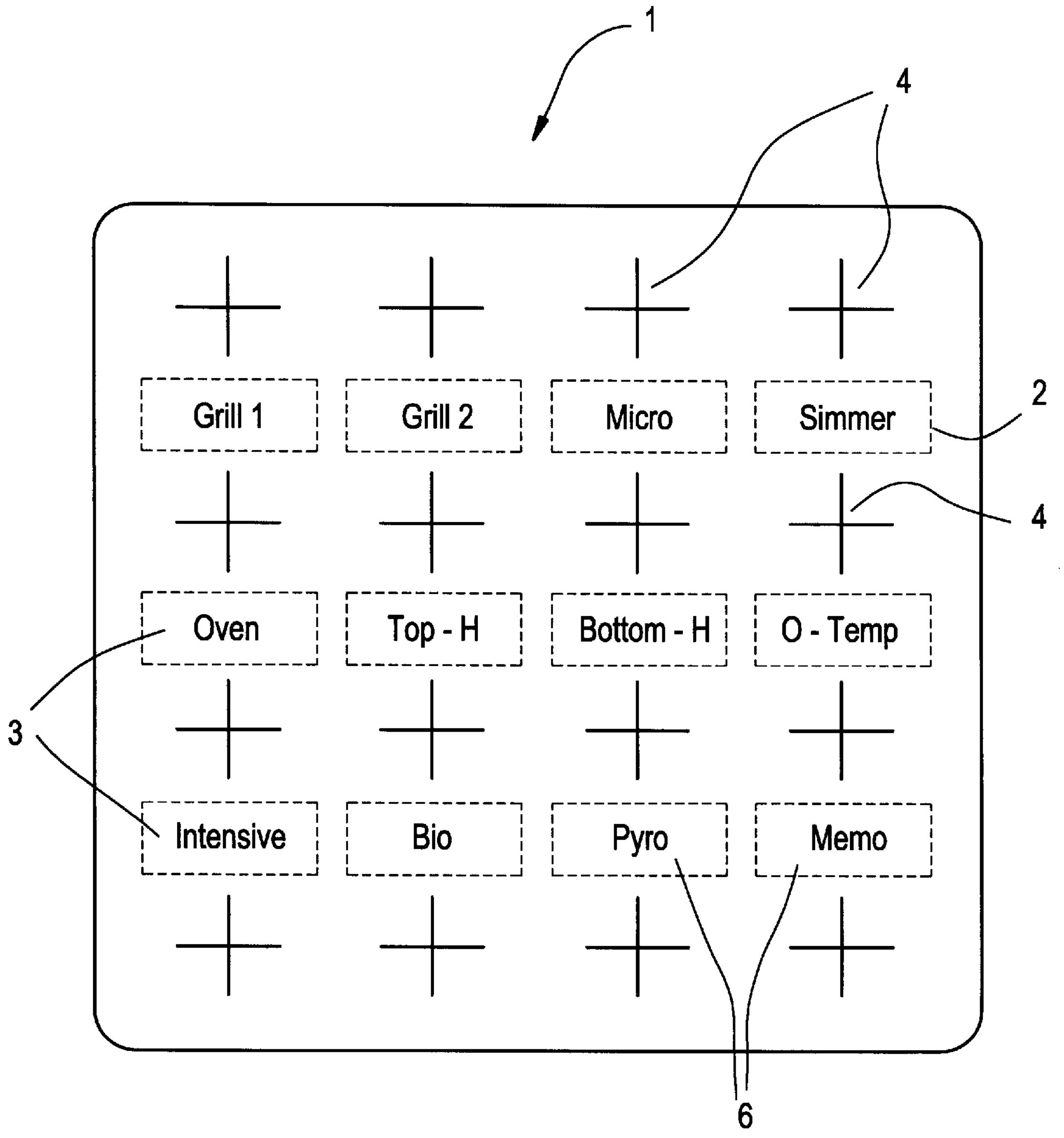
FIG. 1 is a top view of a control surface of a control unit of this invention for a household appliance.

FIG. 1 shows a front of a control unit 1 of this invention having a continuous control surface 2 without perforations, made of a plate of glass or a material similar to glass. As used herein, the designation "control surface" is sometimes used to refer to the plate forming the control surface 2. Operational areas 3 are located on the control surface 2. In relation to these operational areas 3, pressure-sensitive sensors 4, i.e. piezosensors 4 such as BCE-type Sanyo piezodiscs, for example, are placed behind (on a back side of) the control surface 2, preferably in a matrix pattern.

In relation to these operational areas 3, a printed film 5 is applied having symbols for respective functions 6 of each operational area 3. This film 5 is located behind the glass control surface 2.

The piezosensors 4 are preferably arranged so that they are offset from the symbols on the printed film 5, or operational areas 3 of the control surface 2, so that the printed film 5 can be directly illuminated by a light source 7, such as fiber optic light guides or light elements. The film 5 must be light transmissible in order for light from the light source 7 to shine through the film 5.

The control surface 2 is attached to a household appliance (not illustrated), such as a range (stove), by a metal frame 8 (FIGS. 2*a* and 2*b*), in a conventional manner. The device can be attached in an upper area, above an oven door, for example. The control surface 2 can also be attached externally of the appliance, in a separate mounting.

Figure 2B:
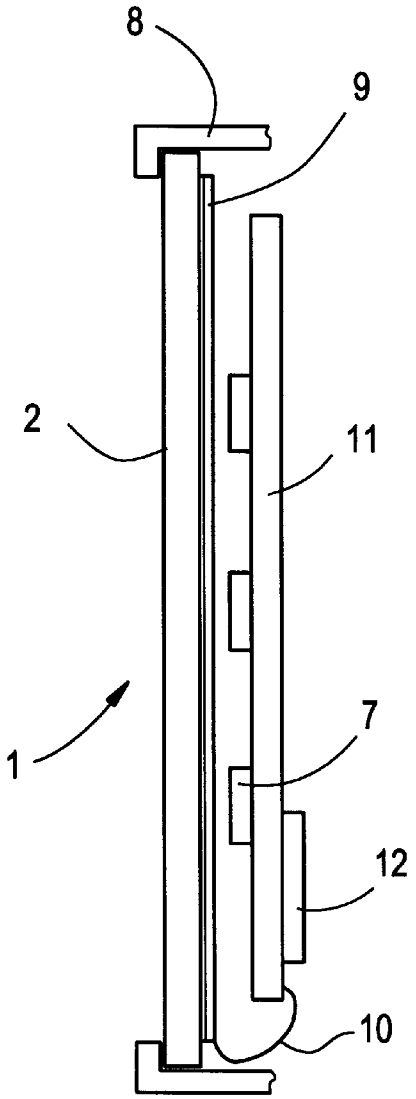
FIGS. 2*a* and 2*b* are schematic side views of installed control surfaces of this invention.
Figure 2A:
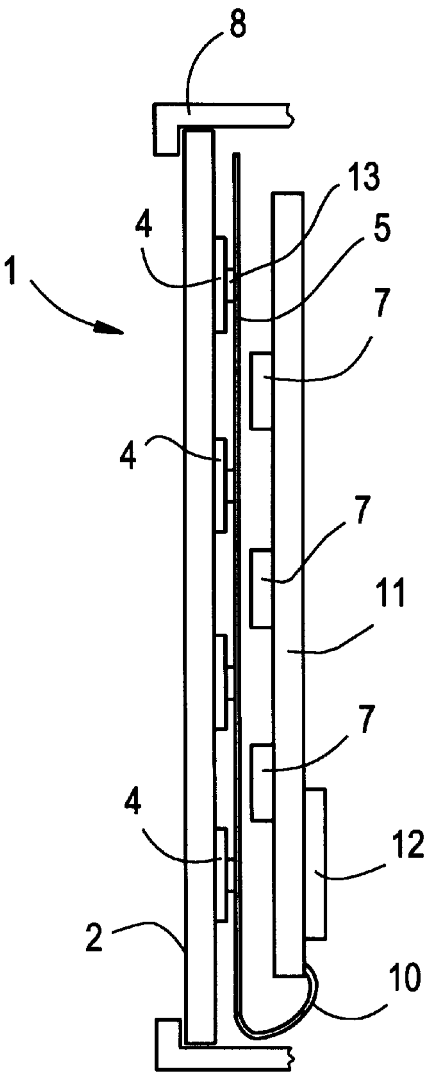
Figure 3:
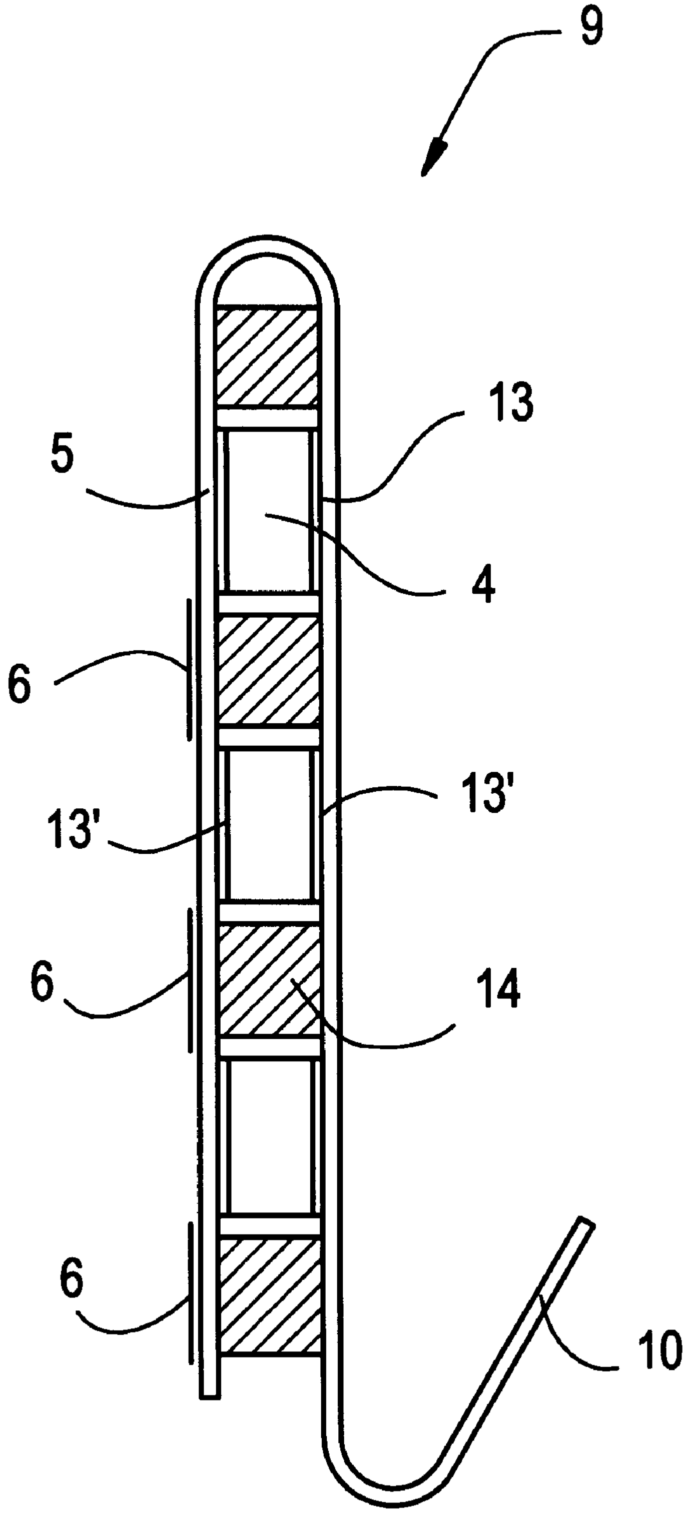
FIG. 3 is a side view of a film packet with sensors for use with the control surface of FIG. 2*b,*

As shown schematically in FIG. 2*b* and FIG. 3, a film packet 9 with integrated piezosensors 4 can be located behind the control surface 2. The film packet 9 is electrically connected by a flexible connector 10 to a printed circuit board 11 that is functionally coupled to, or in communication with, a processor 12.

The film packet 9 includes a single piece comprising a front-and-back film, but it can also include a front film and a covering film connected by a loop. Strip conductors are deposited on these films, electrically connecting the flexible connector 10 and the piezosensors 4. In addition, the film packet has a spacer film 14 between the front and back films.

The light source 7 required for light distribution is preferably located on the printed circuit board 11. On the film packet 9, symbols for functions 6 are printed on the film 5 (FIG. 3). Pressure-sensitive piezosensors 4 electrically connected to the printed circuit board 11 via contacts 13, 13' strip conductors, and the connector 10, are located between the front and back films in the film packet 9. Contacting 13' of the piezosensors 4 takes place via the two sensor surfaces with the front and back films of the film packet 9. The piezosensors 4 are preferably glued in place in the film packet 9, an electrical contact adhesive (conductor adhesive) ensuring the contacting 13'. The spacer film 14, which is punched out at appropriate locations, provides a necessary spacing and height-adjustment compensation in the film packet 9. At the same time, the spacer film 14 serves to properly position the piezosensors 4. The punched out areas in the spacer film 14 are determined by a preferred arrangement of the piezosensors 4 in the film packet 9, and are predetermined by given positions of the function symbols 6 in the control unit 1 of the household appliance.

The film packet 9 is preferably light transmissible in areas without piezosensors 4, so that light from the light source(s) 7 can shine through the printed film 5 in the area of the symbols.

It is an important precondition for operation of the control unit 1 that the film packet 9 be attached firmly to the back of the control surface 2 and that pressure impulses be transmitted directly to the piezosensors, i.e. that the impulses not be attenuated. The piezosensors 4 can also be attached directly to the back of the control surface 2 by a conductive adhesive, and can then be supported by the control surface.

Figure 4:
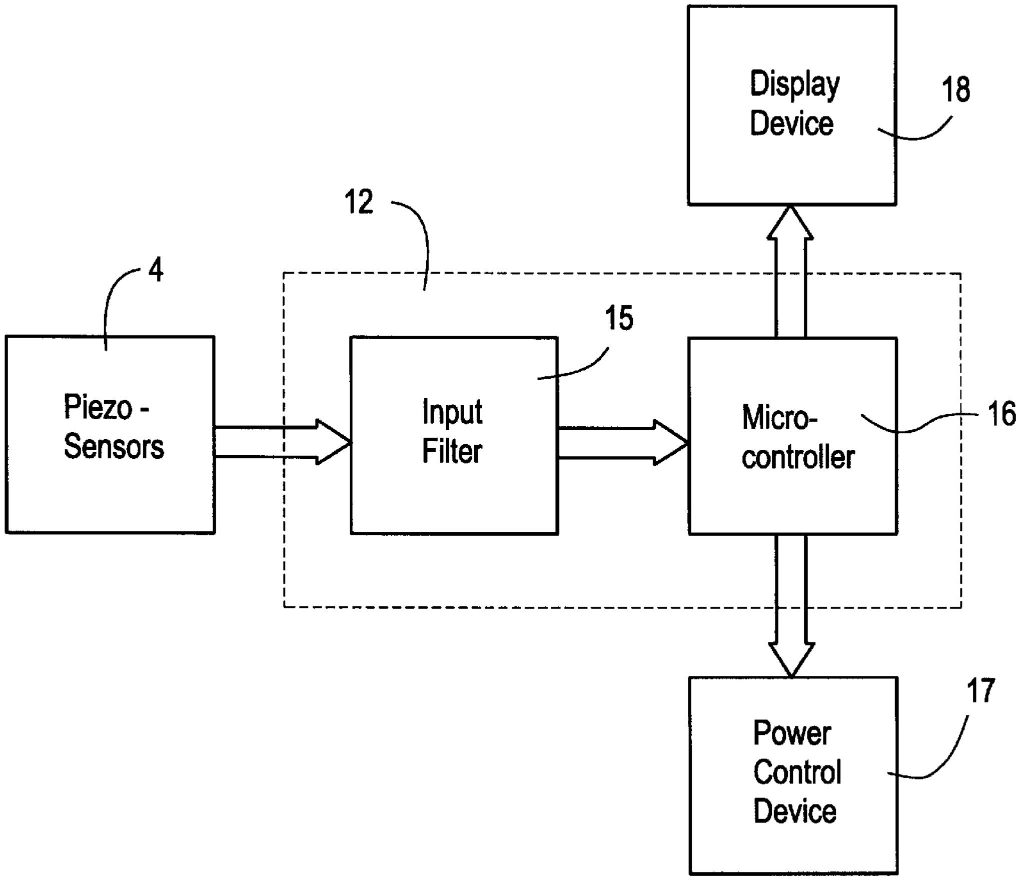
FIG. 4 is a flow chart illustrating carrying out functions with this invention, and FIGS. 5*a, b,* and *c* are respectively plots of measured signals for adjacent sensors.

FIG. 4 shows schematically operation of the unit. When an operator touches the control surface 2, the control surface 2 is distorted at the operational position/area 3. A potential difference is created in a known manner via a charge transfer in a piezosensor 4 located behind the operational area, such as an inverse-operation piezo-oscillator, thereby generating a signal (voltage pulse) from the piezosensor 4. This signal is comprised of two pulses of opposite polarity, the first being caused when the force is applied, the second being caused when the force is removed.

The amplitude of the pulse for a given circuit depends on a size/intensity of a change in pressure on the control surface 2, on a distance of the pressure from the piezosensor 4 in the operational area 3, and on a piezoelectric coefficient of the piezosensor 4 itself. In principle, the sensor signal generated by the piezosensor 4 is forwarded to the processor 12, passing through an input filter 15. The input filter 15 is preferably set at a frequency of 1 Hz, so that rapid unintentional manipulations of the operational area 3 that are picked up and transmitted by the piezosensors 4, such as those generated when the control surface 2 is cleaned, are not evaluated.

From the analog sensor signals passing through the input filter 15, digital signals are generated using conventional circuit components in the processor 12, such as an analog/digital converter for example, which are evaluated by a microcontroller 16 using a defined software package. With the software program, the microcontroller 16 determines which piezosensor 4 is responding to actuation. In addition, the software program checks a switching status of a requested function 6 to which the actuated piezosensor 4 is allocated, i.e. to determine whether the function 6 should be switched on or off. This makes possible the use of only one piezosensor 4 for switching a function 6 on or off. When the "Oven" function 6 is to be switched on, for example, the microcontroller 16 determines its functional status (on/off) after detecting the activated piezosensor 4 associated therewith and the related function 6, and controls the light source 7 behind the control surface 2 associated with the "Oven" function 6, as well as a power control device 17 of the stove for switching the oven on or off. To provide a visual indication of the selected function 6, a lighting behind the printed film 5 changes color, to indicate a selection. To this end, a light source 7 illuminating the printed film 5 at the appropriate position is switched from red to green, for example, which can be accomplished by a known two-color LED. An additional display device 18, such as a graphic liquid crystal display (LCD), can be mounted in an area of the stove, and can display various values in a conventional manner.

Figures 5A, 5B, 5C:
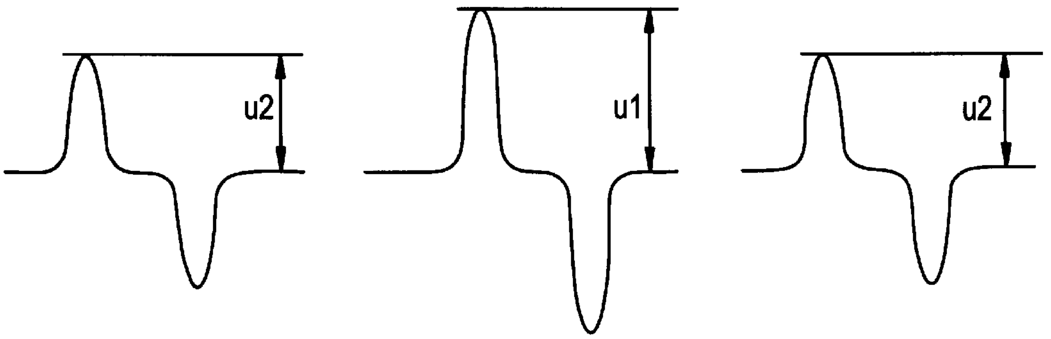

Since the back of the control surface (that is, the plate) 2 has several pressure sensitive piezosensors 4 arranged thereon in a matrix pattern, pressure exerted at one operational area 3 for a function 6, such as "Grill 1" for example, is also detected by other piezosensors 4 for the other functions 6, such as "Grill 2" or "Oven", for example, resulting in a voltage pulse at each location, as well. The amplitudes of these pulses decrease the farther the piezosensors 4 are from the operational area 3 that is being pressed. The piezosensor 4 located closest to the area of the control surface 2 that is being actuated sends the strongest quantitative signal U1 (FIG. 5*b*), while the adjacent piezosensors 4 send quantitatively weaker signals U2 (FIGS. 5*a* and 5*c*). All signals U1, U2 generated in this manner are transmitted to the microcontroller 16 through the input filter 15. In this process, all adjacent sensor signals U2 reach the microcontroller 16 for control, and are taken into consideration by the microcontroller 16 in evaluating the function selection. A determination of the exact function selection 6 is achieved by evaluating the amplitudes of the pulses, and thus by the signal strengths of the signals generated by the piezosensors 4 arranged in the matrix pattern. A pattern stored in the microcontroller 16 tracks, or recreates, this matrix arrangement of the piezosensors 4 by use of an internal memory calculation in the processor 12, so that, with a row and column arrangement, the piezosensor 4 with the greatest amplitude in the pattern can be identified by comparing it the piezosensors 4 that have been actuated, and thereby the selected function 6 can be determined. The software program performs this technical operation.

It has been determined that a deformation of only a few micrometers (2 to 5 micrometers), which occurs on the control surface 2 when pressure is applied at an operational area 3 of the control surface 2, generates signals U1, U2 from the piezosensors 4 that are adequate for evaluation. The piezosensor 4 located nearest the pressure point, as described above, generates a higher voltage signal U1 than do more remote piezosensors 4. The processor 12 uses this fact to identify and trigger a function 6. The same is true when several signals of equal intensity are present, in relation to weaker signals from the remaining piezosensors 4.

In addition to switching the appliance on and off, as described above, the control unit 1 also provides control of a power control device 17 in the stove, such as control of an "Oven Temperature" function 6. This can be accomplished by a piezosensor 4 for increasing (+) the temperature and an additional piezosensor 4 for decreasing (–) the temperature.

To this end, a pulse generated in the piezosensor 4 for increasing the temperature when pressure is exerted on the control surface 2 is measured as a positive pulse, a pulse generated when the pressure is released is measured as a negative pulse, and a time interval between the positive and negative pulses is determined. The software program fills this interim time period (Δt) with timing pulses, with a defined increase in temperature being allocated by the software for each timing pulse.

The set temperature is displayed in a display area (not illustrated) of a known display device 18.

The software prevents excessive temperature increases in the oven, e.g. >250° C.

For decreasing the temperature, the two pulses are determined after pressure is exerted on the piezosensor 4 for decreasing the temperature, in a similar manner; the time between the pulses being measured, and as was the case for increasing the oven temperature, the processor 12 software fills the interim time period with timing pulses, resulting in a defined decrease in temperature for each timing pulse.

The same piezosensors 4 that control the temperature functions 6 can also switch the oven on and off. To accomplish this, the pulse generated in the piezosensor 4 for increasing the temperature when pressure is applied to the control surface 2 is used as a positive pulse for switching the oven on, for example.

For increased ease of operation, several piezosensors 4 can be allocated to a function 6, and thus to an operational area 3, making a more accurate evaluation of the selected function 6 possible. The processor 12 performs the evaluation as described above.

It is evident that the structure can be modified within the fundamental concept of this invention. For example, appropriate hardware and/or software can provide additional safety checks. This applies specifically for child safety features, and for guarding against multiple selections. The sensors 4 can also frame the control area 2, so that the sensors are not arranged in a matrix pattern. Similarly, the sensors 4 may be arranged to be directly beneath the printed film 5, so that the light source 7 is slightly offset with respect to the film 5.

An integrating evaluation of the signal area (FIGS. 5*a–c*) of the sensor signals by the processor 12 simplifies distinguishing between intentional and accidental, i.e. unintentional, actuation of the control surface 2. To activate a function 6, an adult need exert only moderate pressure during intentional manipulation of the control surface 2, but for a fairly long period of time. The pressure variations over a longer period of time generate a correspondingly large integrated area under the sensor signal. By contrast, a comparatively weak pressure over a brief period of time creates a correspondingly small integrated area, and none of the functions 6 is activated. Pressure of this type is generated when the control surface 2 is cleaned, for example when the surface of the operational area 3 is wiped.

The control unit 1 can be easily adapted to meet requirements of various household appliances. A function design of the processor 12 need only be made suitable and the function symbols on the control surface 2 can be rearranged as is necessary.

The piezosensors are located behind a control surface (or plate), which can be made of a transparent material, preferably glass, for visual signals, but may also be made of another material of stable form, such as metal, plastic, or wood. This control surface can have symbols printed on a front side and, if it is of glass, on a reverse side thereof, with the control surface acting as a touching surface for the user.

By using a control surface that is not perforated and is continuous at least in the operational areas, the components located behind it are protected against environmental influences such as dust and moisture.

Offset positioning of the sensors in relation to the respective operational areas of the control surface is advantageous since the control surface, with the printed function symbols, can then be illuminated directly by a light source. By utilizing several sensors pertaining to one operational area, and thus to one function, the processor receives a clear assignment (statement) of the selected function, even if pressure is applied only in a general vicinity of the operational area.

The sensors themselves are preferably located in a film packet, whereby the sensor surfaces are advantageously contacted directly with strip conductors of an inner-facing front and an inner-facing back of film material, by contact adhesives. This makes for a simple structure of the film packet and provides excellent mechanical fixation of the sensors and of the printed film on a back side of the control surface during manufacture of the household appliance, providing indirect connection between the sensors and the control surface. However, the sensors can also be installed directly on the back of the control surface by a bonding agent or conductive adhesive.

It is important for the piezosensors to be connected rigidly or fixedly to the control surface. The piezosensors, preferably arranged in a matrix pattern, make up small cambered areas in the control surface.

While the invention has been particularly shown and described with reference to a preferred embodiment, it will be understood by those skilled in the art that various changes in form and detail may be made therein without departing from the spirit and scope of the invention.

The invention claimed is:

1. A control unit for switching and controlling household appliances, particularly for use with large household appliances, said control unit including:

a plate that is stable in form and having a control surface without perforations formed thereon for being touched, said control surface including operational areas associated with functions to be activated by said control unit;

separate individual pressure-sensitive sensors firmly coupled to the plate for generating simultaneous electrical signals in response to pressure being applied at a pressure point on the control surface, relative intensities of the respective signals, each depending upon a location of the sensor which created the signal relative to the pressure point on said control surface;

a processor coupled to the sensors for receiving and evaluating the signals and for determining a location of the pressure point on the control surface in relationship to the operational areas and thereby determining a function to be carried out by the control unit.

2. A control unit as in claim 1, wherein the plate forming the control surface is made of a light-transmitting material.

3. A control unit as in claim 2, wherein symbols identifying the functions are applied to the plate forming the control surface inside the operational areas, and wherein are further included light sources located adjacent the plate for illuminating the symbols.

4. Control unit as in claim 1, wherein the plate is made of a non-transparent material.

5. Control unit as in claim 4, wherein the non-transparent material is a metallic material.

6. Control unit as in claim 4, wherein the non-transparent material is a plastic.

7. Control unit as in claim 4, wherein the symbols identifying the functions are placed on the non-transparent material, and wherein is further included an external display device for displaying selected functions.

8. Control unit as in claim 1, wherein piezosensors are coupled to the plate by a mounting device.

9. Control surface as in claim 8, wherein the mounting device is an indirect mounting device comprising a film packet.

10. Control unit as in claim 8, wherein the mounting device is a direct mounting device comprising a conductive adhesive.

11. Control unit as in claim 1, wherein the piezosensors are arranged in a matrix pattern on a back of the plate, opposite the control surface.

12. Control unit as in claim 1, wherein there is at least one piezosensor for each operational area arranged on a back of the plate.

13. Control unit as in claim 1, wherein there is more than one piezosensor for each operational area arranged on a back of the plate.

14. Process for switching and controlling household appliances, especially large household appliances, comprising the steps of:

providing a control unit having: a control surface without perforations and being formed on a plate of stable form; separate individual pressure-sensitive sensors coupled to the plate for generating electrical signals when pressure is exerted at a pressure point on the control surface at a position for selecting a function represented by the position on the control surface; and a processor for receiving and processing the signals;

generating simultaneous signals of differing intensities with the pressure-sensitive sensors when pressure is exerted at the position on the control surface, each intensity depending upon a location of the sensor which created the signal relative to a location of the position on the control surface;

evaluating the intensities of the signals with the processor by comparing them with each other and determining the signal with the greatest intensity which represents the pressure position on the control surface, and thus the selected function associated with that position; and controlling the function with the processor.

15. Process as in claim 14, wherein an arrangement of the sensors on the plate is stored in an internal memory of the processor 12 and this stored arrangement is used for determining the selected function.

16. Process as in claim 14, wherein undesired signals generated by unintentional actuation of the control surface are filtered out by an input filter of the processor.

17. Process as in claim 14, wherein an integrating evaluation of signal area of the signals is performed in the processor to distinguish intentional from unintentional application of pressure to the control surface.

* * * * *